No. 754,191. PATENTED MAR. 8, 1904.
J. C. BEIL.
FRUIT PEELER.
APPLICATION FILED MAY 23, 1903.
NO MODEL.

Inventor
J. Carl Beil,

Witnesses
By
W. C. Carman
Attorney

No. 754,191. Patented March 8, 1904.

UNITED STATES PATENT OFFICE.

JACOB CARL BEIL, OF YOUNGSTOWN, OHIO.

FRUIT-PEELER.

SPECIFICATION forming part of Letters Patent No. 754,191, dated March 8, 1904.

Application filed May 23, 1903. Serial No. 158,436. (No model.)

*To all whom it may concern:*

Be it known that I, JACOB CARL BEIL, a citizen of the United States, residing at Youngstown, in the county of Mahoning and State of Ohio, have invented new and useful Improvements in Fruit-Peelers, of which the following is a specification.

This invention relates to an improved fruit-peeler of a simple and practical form and comprising means for enabling a person to properly skin or peel fruit, such as oranges, with facility and expedition.

To this end the invention contemplates a device designed for table or kitchen use and possessing special utility as an orange-peeler, whereby the skin, peel, or rind of the orange may be neatly removed without crushing the meat and causing the juice to run, which is usually a matter of inconvenience and annoyance in eating oranges or preparing the same for a dish.

With these and many other objects in view, which will more readily appear as the nature of the invention is better understood, the same consists in the novel construction, combination and arrangement of parts, which will be hereinafter more fully described, illustrated, and claimed.

The essential feature of the invention involved in the novel relation between the peeling-blade and the slitting-knife is susceptible to some structural modification without departing from the scope of the invention; but the preferred embodiment of the latter is shown in the accompanying drawings, in which—

Figure 1:
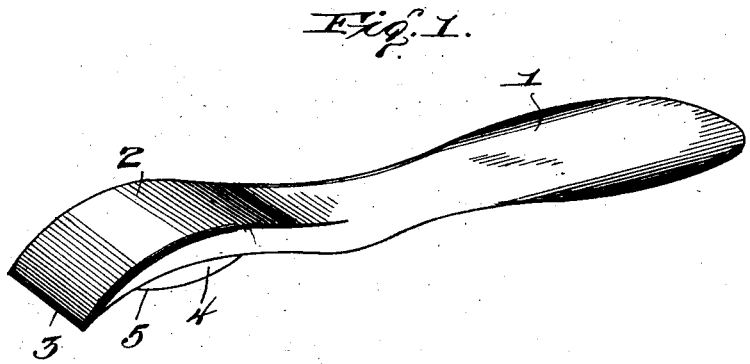
Figure 2:
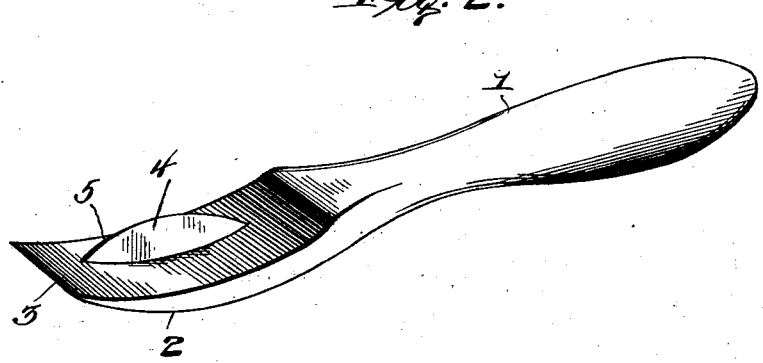
Figure 3:
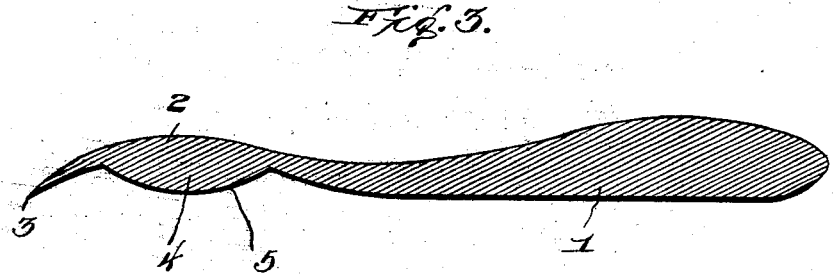

Figure 1 is a perspective view of a fruit-peeler constructed in accordance with this invention. Fig. 2 is an inverted perspective view of the device. Fig. 3 is a longitudinal sectional view thereof, showing a preferable formation which involves an integral structure.

Like reference-numerals designate corresponding parts throughout the several figures of the drawings.

The invention may be carried out in conjunction with any form of handle-shank or supporting member, and the device may be constructed integrally or in sections without affecting the special feature claimed; but for the purpose of exemplifying the improvement a preferable manner of constructing the device is illustrated in the drawings. In this preferable construction the entire device may be made of a single piece of metal and is of such a form as to be susceptible of manufacture through the medium of a stamp or die in the same manner as table-forks are commonly made.

Referring particularly to the construction as shown in the drawings, the numeral 1 designates the handle-shank of the device, which is formed to provide a suitable grip or handle and is thinned out at one end to form a peeling-blade extension 2, curved in the direction of its length. This longitudinally-curved peeling-blade extension from the handle-shank is shaped to conform to the general curvature of the body of an orange or similar fruit and at its outer end is provided with a transverse sharpened terminal stripping edge 3, which is utilized to facilitate the stripping or peeling off of the skin or peel of the fruit.

A distinctive feature of the present invention resides in associating with the longitudinally-curved peeling-blade 2 an offstanding slitting-knife 4, disposed normal to and longitudinally of the peeling-blade or peeling-blade extension 2. This offstanding slitting-knife is usually formed integrally with the blade 2 and projects a sufficient distance from the inner face of said blade to provide for piercing and cutting the skin, rind, or peel when drawn over the same. This slitting-knife may be of any suitable configuration, but is preferably formed with a curved cutting edge 5, presenting rounded end portions to facilitate the entrance into and passage through the skin or peel. In all adaptations of the invention the said knife is not only disposed normal to and longitudinally of the blade 2, but is also located within the concavity thereof, whereby the blade 2 will constitute a guiding-shield for the knife as it is drawn about the peel of the fruit. In this connection it is to be observed that the slitting-knife 4 is preferably shorter than the length of the peeling-blade 2.

In using the device, for instance, in connection with an orange the skin or peel is cut into quarters or any desired divisions by drawing the knife 4 around the skin or peel from one side of the orange to the other, after which the terminal stripping edge 3 is inserted successively beneath the individual sections of the slitted skin or peel, whereby the latter may be stripped or peeled off of the meat very smoothly and perfectly.

From the foregoing it is thought that the construction, use, and advantages of the herein-described fruit-peeler will be readily apparent without further description, and it will also be understood that changes in the form, proportion, and minor details of construction may be resorted to without departing from the spirit of the invention or sacrificing any of the advantages thereof.

Having thus described the invention, what is claimed, and desired to be secured by Letters Patent, is—

1. A fruit-peeler comprising a member having a longitudinally-curved peeling-blade provided with a terminal stripping edge, and a slitting-knife disposed longitudinally of and normal to said blade within its concavity and midway between the side edges thereof.

2. A fruit-peeler comprising a handle carrying a longitudinally-curved peeling-blade provided with a terminal stripping edge, and a slitting-knife arranged within the concavity of the blade and disposed normal thereto, said knife being shorter in length than the curved blade and presenting a curved edge.

In testimony whereof I have signed my name to this specification in the presence of two subscribing witnesses.

J. CARL BEIL.

Witnesses:
   GEORGE EDWARDS,
   BEULAH NIXON.